United States Patent [19]

Richter

[11] 4,297,920
[45] Nov. 3, 1981

[54] CYCLOIDIC GEAR

[76] Inventor: Hans Richter, Oberlanderstrasse 123, D-8900 Augsburg, Fed. Rep. of Germany

[21] Appl. No.: 55,131

[22] Filed: Jul. 5, 1979

[30] Foreign Application Priority Data

Jul. 13, 1978 [DE] Fed. Rep. of Germany ....... 2830909

[51] Int. Cl.³ .......................... F16H 1/28; F16H 35/00
[52] U.S. Cl. ......................................... 74/804; 74/390
[58] Field of Search ................. 74/804, 800, 390, 406, 74/63

[56] References Cited

U.S. PATENT DOCUMENTS

| Re. 17,811 | 9/1930 | Braren | 74/804 |
|---|---|---|---|
| 1,773,568 | 8/1930 | Braren | 74/804 |
| 3,073,184 | 1/1963 | Braren | 74/804 |
| 3,160,032 | 12/1964 | Black | 74/804 |
| 4,050,331 | 9/1977 | Braren | 74/804 |

FOREIGN PATENT DOCUMENTS

| 859552 | 12/1952 | Fed. Rep. of Germany | 74/804 |
|---|---|---|---|
| 2143493 | 3/1973 | Fed. Rep. of Germany | 74/804 |
| 1090292 | 3/1955 | France | 74/804 |
| 1359792 | 3/1964 | France | 74/804 |
| 402617 | 3/1943 | Italy | 74/804 |

Primary Examiner—Leslie Braun
Attorney, Agent, or Firm—Pollock, Vande Sande & Priddy

[57] ABSTRACT

A cycloid gear is provided which comprises a pair of eccentric discs which are attached to a drive shaft and which carry curved discs thereon having outer peripheries of cyclodic curved shape which roll off along a plurality of rollers that engage said outer peripheries, the pair of curved discs having bore holes extending therethrough in overlapping relation to one another respectively to define an effective axially directed opening through each pair of overlapping bore holes, there being a plurality of axially directed bolts which pass through said effective axially directed openings and which are connected to an output shaft to drive the output shaft as the curved discs rotate with rotation of the drive shaft and eccentric discs. Each bolt carries a resilient roller whose unstressed outside diameter is greater than the predetermined minimum dimension of the effective axially directed opening with which said bolt is associated, whereby said rollers transmit the rotational movement of the curved discs to the output shaft without any clearance and preload the gear.

1 Claim, 3 Drawing Figures

U.S. Patent   Nov. 3, 1981   4,297,920
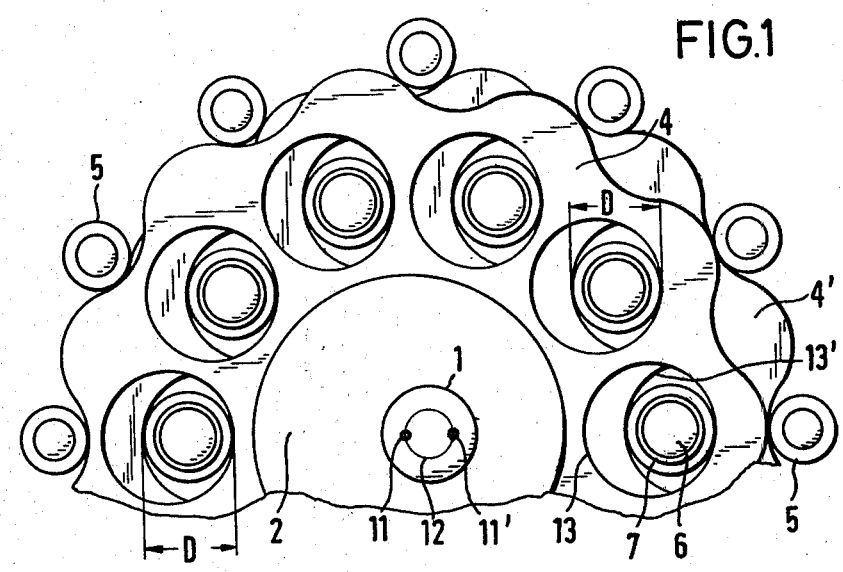
FIG.1
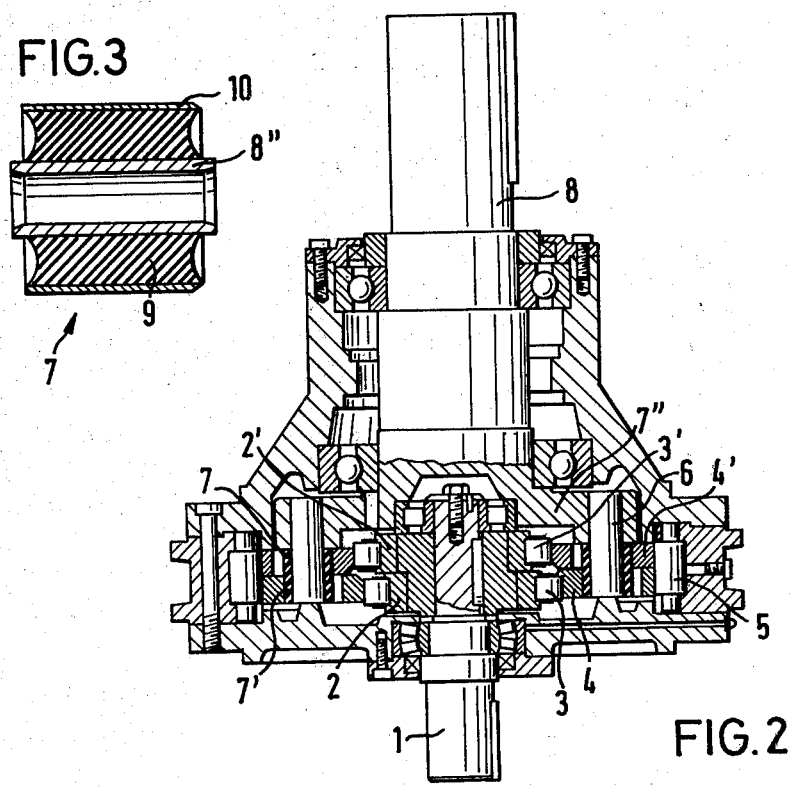
FIG.3
FIG.2

CYCLOIDIC GEAR

This invention relates to an improvement in a cycloid gear of known type having a drive shaft which is connected to at least one eccentric disk in a nonrotating manner, upon which there is placed a curved disk having a cycloidic outside curved shape, whose outside curved shape rolls off along centrically arranged outside rollers. The rotational movement of the curved disk is transmitted to an output shaft by means of carrier bolts which are connected to the output shaft and which protrude through ring-shaped arranged boreholes in the curved disk.

Such cycloid gears reveal a large reduction ratio. For example, if the curved disk has an outer periphery of cycloidic curve shape consisting of 50 curve lines, then the curved disk and thus the output shaft will perform one revolution for every 50 revolutions of the drive shaft. Usually, two eccentric disks are used which have been displaced by 180° with respect to each other and which are associated with two 180°-displaced curved disks. This makes for an equalization of the eccentric rotating masses.

In the known cycloid gears, there are a series of disadvantages. There is a certain degree of clearance between the boreholes of the curved disks, which are arranged in a ring-shaped pattern, and the carrier bolts, whereby the output shaft is not carried by the curved disks without some clearance. This clearance produces an undesirable effect, especially in case of a change of the direction of rotation, i.e., it causes an oscillation of the output shaft in both directions of rotation. Accordingly, such cycloid gears are unsuited for certain purposes.

The present invention obviates this problem by providing a cycloid gear which is so designed that the rotation movement of the curved disks will be transmitted to the output shaft without any clearance.

One example of the present invention will be explained in greater detail below by reference to the drawing, wherein FIG. 1 is a diagram showing the gear for the purpose of explaining the motion process;

FIG. 2 is a cross-section through the gear, and

FIG. 3 is a cross-section through a spring-supported carrier roller.

A drive shaft 1 is connected in a nonrotating manner with two eccentric disks 2, 2' which are displaced by 180° with respect to each other. When drive shaft 1 is rotated, each of the eccentric disks 2, 2', via roller body 3, 3', moves a curved disk 4, 4', i.e., the imaginary center 11, 11' of each curved disk 4, 4' will move along a circle 12 whose radius is equal to the eccentricity of each eccentric disk 2, 2'. The curved disks 4, 4' roll off along outside rollers 5 which are arranged in a concentric manner with respect to drive shaft 1. For this purpose, the curved disks 4, 4' have an outer periphery of cycloidic curved shape. For each revolution of the eccentric disks 2, 2', the curved disks 4, 4' thus will rotate incrementally by one curve segment, i.e., if the curved disks 4, 4' have 50 curve segments, then there will be one revolution of the curved disks 4, 4' after the drive shaft 1 has performed 50 revolutions. The reduction ratio thus is 50:1.

The slow rotation movement of the curved disks 4, 4' is transmitted to the output flange 7" of the output shaft 8 by means of carrier bolts 6 which are positioned on flange 7" and which extend through boreholes 13, 13' that are arranged in a ring-shaped pattern in the curved disks 4, 4'.

To eliminate the above-mentioned clearance, spring-supported carrier rollers 7, 7' are placed upon the carrier bolts 6, specifically, one roller 7, 7', each, for each curved disk 4, 4'. These carrier rollers 7, 7' are so sized that they are in contact with the walls of the boreholes 13, 13'.

By using the spring-supported carrier rollers 7, 7', it becomes possible to operate the gear without any clearance. It is even possible to preload the gear by making the outside diameter of the carrier rollers 7, 7' slightly bigger than the smallest inside interval D between the boreholes 13, 13', that is to say, the distance of mutually opposite contact lines between the borehole 13 and the carrier roller 7 and the borehole 13' and the carrier roller 7'. The spring-supported rollers 7, 7' act as shock absorbers and thus provide protection against any overloads. The manufacturing tolerances of the gear can be increased because the spring-supported rollers 7, 7' can compensate for major tolerances. The force transmission between drive shaft 1 and output shaft 8 is more uniform as a result of which the gear stressability can be increased. The gear's effficiency is influenced in a very insignificant manner by the above-mentioned pre-load of the carrier rollers 7, 7'.

The carrier rollers 7, 7' consist of a bush 8" which is rotatably arranged on the particular carrier bolt 6, a tubular sleeve 9 which is arranged on the bush and which consists of rubber-elastic material, and a deformable tubular metal casing 10 which surrounds the sleeve 9.

I claim:

1. In a cycloid gear of the type comprising a drive shaft, a pair of eccentric disks connected to said drive shaft and displaced by 180° from one another, a pair of curved disks disposed around said pair of eccentric disks respectively, said curved disks respectively having outer peripheries of cyclodic curved shape which roll off along a plurality of rollers that are in engagement with said outer peripheries and that are disposed in an array concentric with said drive shaft, each of said curved disks having a plurality of boreholes therein disposed in a ring shaped array, the boreholes in said curved disks respectively overlapping one another in pairs to define an effective axially directed opening through each pair of overlapping boreholes, an output shaft, and a plurality of axially directed bolts extending through said effective axially directed openings respectively and connected to said output shaft for driving said output shaft as said input shaft, said eccentric disks and said curved disks rotate, the improvement wherein said effective axially directed openings have a predetermined minimum dimension in a direction transverse to said shafts, each of said bolts having resilient carrier roller means thereon comprising a bush surrounding its associated bolt, a tubular sleeve of resilient material surrounding said bush, and a deformable tubular metal casing surrounding said resilient sleeve, the outside diameter of said tubular metal casing being the outside diameter of said carrier roller means, and the unstressed outside diameter of said carrier roller means being greater that the said predetermined minimum dimension of the axially directed opening through which said resilient carrier roller means passes, whereby all of said resilient carrier roller means are in continual resiliently compressed engagement with the opposing portions of the overlapping boreholes which define the effective axially directed openings through which said resilient carrier roller means pass respectively and operate, by reason of the compression of said resilient carrier roller means, to preload said gear.

* * * * *